Dec. 12, 1961  K. O. TECH ET AL  3,013,258
TOOL CONTROL UNIT
Filed March 4, 1959
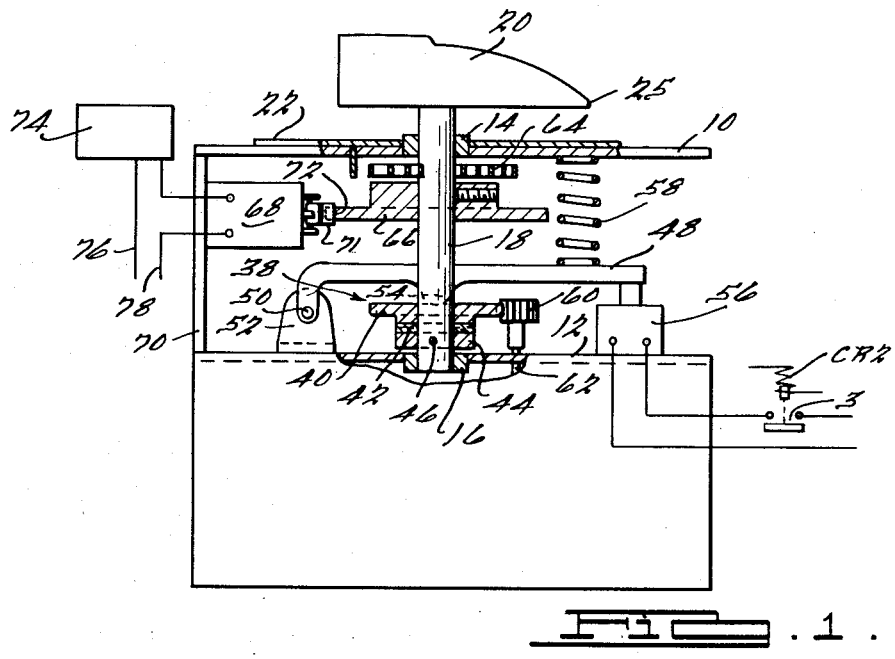
FIG. 1.
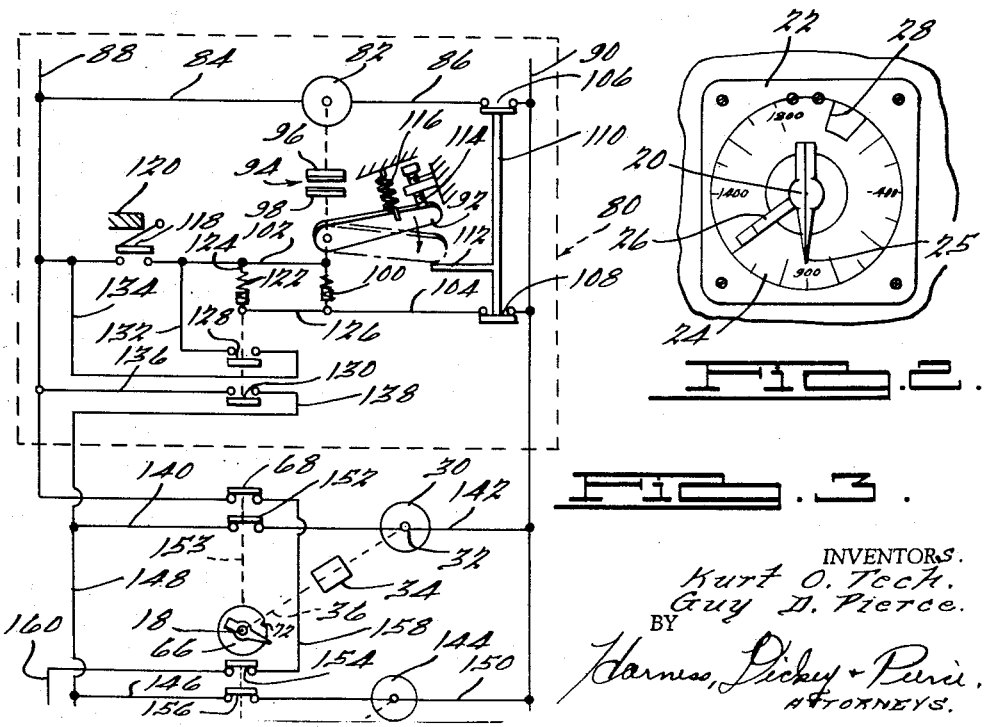
FIG. 2.
FIG. 3.
INVENTORS.
Kurt O. Tech.
Guy D. Pierce.
BY
Harness, Dickey & Pierce.
ATTORNEYS.

though to designate the
United States Patent Office
3,013,258
Patented Dec. 12, 1961

3,013,258
TOOL CONTROL UNIT
Kurt O. Tech, East Detroit, and Guy D. Pierce, Detroit, Mich., assignors to The Cross Company
Filed Mar. 4, 1959, Ser. No. 797,262
7 Claims. (Cl. 340—267)

This invention relates to new and useful improvements in apparatus for programing tool changes for a machine tool of the type having a plurality of different tools adapted to perform work on workpieces in the machine and having different spans of sharp life.

More particularly, this invention is concerned with a tool programing apparatus of the type shown in the Cross et al. Patent No. Re. 24,491 which is intended primarily for use with a machine tool of the type having a large number of different tools. Such machines usually are automatic or semiautomatic in operation and frequently are attended by a relatively small number of machine operators whose primary duty is to service the machine periodically and to change tools when necessary.

Under the above circumstances, tool changing becomes a difficult matter. In some instances a tool may have a life expectancy of only a few hundred operations whereas in other instances a tool may have a life expectancy of thousands of operations. Thus, all of the tools are not changed at the same time and many of the tools are changed at widely different time intervals. This of course makes it more difficult for the operator to make sure that the tools are changed properly.

If a tool is allowed to run too long in the machine it becomes excessively dull. When this occurs, the tool may produce defective parts that must be scrapped or reprocessed at considerable cost. Moreover, a dull tool wears rapidly and it may be necesary to cut an excessive amount of the tool away when it is sharpened. This results in a waste of the tool and increases the tool cost of the machine. Ultimately, of course, this is reflected in the manufacturing cost of the part produced by the machine.

The apparatus disclosed by the Cross patent hereinabove referred to was developed primarily to enable the operator, under the circumstances hereinabove described, to establish and maintain an efficient tool change program. It is pre-eminently satisfactory for this purpose. However, the programing apparatus, by itself, will not detect when a tool is broken or incorrectly set initially in the machine. The copending application Serial No. 781,089 which was filed in the Patent Office the 17th day of December, 1958 discloses an apparatus that will detect when a tool breaks or is improperly set in the machine, and it can be made to signal the operator upon the occurrence of such a contingency.

The instant invention is a modification or improvement in the patented programing apparatus which enables it to be adapted for use together with the broken tool detector apparatus shown in the application to apprise the operator not only when a tool needs changing but also to let him know if a tool is broken or improperly set in the machine. By using the modified or improved apparatus in this manner, the operator is warned immediately when a tool change or adjustment is necessary and he can tell instantly which tool in the machine is at fault.

In the drawing forming a part of this specification and wherein like numerals are employed to designate the parts throughout the same.

FIGURE 1 is a side elevational view, showing parts in section, of the modified or improved electrically operated device of the type used in the tool programing apparatus, FIG. 2 is a fragmentary front plan view of the device; and FIG. 3 is an electrical diagram showing the apparatus associated with a machine tool and illustrating diagrammatically the manner in which the apparatus operates to perform its intended function.

Considered in certain of its broader aspects, the apparatus of this invention comprises a plurality of electrically operated devices each associated with a respective different tool in the machine. In some instances a device may represent a single tool. In other instances, where there are a plurality of identical tools all having the same life expectancy, a device may represent a plurality of tools. However, in every instance where there are different tools having different life expectancies, separate devices are required for the different tools.

In the form of the invention here shown, the electrically operated devices have rotatable pointers which traverse scales calibrated in terms of tool life. All of the devices are electrically connected to a master control switch mounted for operation by some part of the machine having a definite relationship to tool operations. Any convenient operating part of the machine can be used. For example, a slide which carries one of the tool heads and which operates once for each operating cycle of the machine can be used. In this instance, the slide operates the master switch once each time the machine cycles, and accordingly once for each operation for all of the tools in the machine. An electrical impulse resulting from operation of the switch is transmitted to all of the electrically operated devices which, in turn, advance their respective pointers one increment of dial space.

Manifestly, other parts of the machine or mechanism related to the machine can be used to operate the master switch. For example, if the machine is equipped with a transfer device which functions once for each operating cycle of the machine, the master switch can, if desired, be located for operation by a suitable operating part of the transfer device.

In the embodiment shown, the pointers are actuated by motors controlled by electrical timers. In almost every instance it is necessary to connect the drive shaft of the motor to its respective pointers by reduction gearing. As a consequence, the motion actually transmitted to the pointer during a machine cycle may be imperceptible. Also, it will be apparent that different reduction gearing may be required in one instance than in another inasmuch as the dial or scale of each device is calibrated in terms of the particular tool with which it is associated. It may be necessary to impart a greater number of movements to one pointer than to another in order for it to traverse its scale. For example, a device associated with a tool having a life expectancy of 5,000 operations will have a scale calibrated to show the 5,000 operations, and it will be necessary to impart 5,000 increments of motion to the pointer in order for it to traverse the scale. In this situation the device must, of course, be equipped with reduction gearing that will provide the 5,000 increments of motion required. In another situation where the electrically-operated device is associated with a tool having a life expectancy of 10,000 operations, reduction gearing is required that will impart only half the motion to the pointer for each operating cycle of the machine.

From the foregoing, it will be apparent that different types of indicating devices can be used in practising the invention. For example, various types of known devices having pointers which move in a straight path can be adapted for use in this invention and such use is contemplated and within the scope of the invention. Also, instead of using motor and timer means for actuating the pointers, motion can be transferred mechanically by a conventional solenoid operated pawl and ratchet mechanism.

The scales of the electrically operated devices have selected visible start positions and stop positions, the distance between which represents in each instance the optimum life of the particular tool with which the scale is associated. If desired, the scales can be equipped with adjustable stop members which provide the starting positions. These stops have the advantage that they can be selectively positioned at any point within the range of the scale, and they can be moved or adjusted as required, initially at least, in determining the optimum life of the tool with which it is associated. The pointers are individually manually movable to their selected starting positions and between the start and stop positions.

In normal operation, each pointer is moved initially to its starting position after the tool or tools with which it is associated are changed. The master switch is operated for each cycle of the machine to advance all of the pointers one increment of dial space. In this manner the pointers are moved successively step-by-step from their starting positions at a rate to cause each pointer to reach its stop position when the optimum life of the tool with which it is associated has expired. The above operation is repeated for successive cycles of the machine until one of the pointers reaches its stop position.

Some means preferably is provided to apprise the operator that one of the pointers has reached its stop position, and means also preferably is provided to inform the operator of the particular device that has counted out. Various signaling means may be employed. For example, each device can be made to close a switch when its pointer reaches the stop position, and the switch can be used to close a circuit through an associated light which is visible to the operator or to close a circuit through a bell which rings to warn the operator that a tool requires changing. Alternatively, the switch operated by the device as the pointer moves to its stop position can be inserted in the operating circuit of the machine so that the latter is shut down automatically whenever a tool change is required. If desired, the machine can be shut down and a bulb also lighted so that the operator is informed that a tool change is required and simultaneously apprised of the particular tool requiring changing.

In order to assist the operator in making tool changes, the electrically operated devices preferably are mounted on a board or panel, and each is identified or correlated by number or otherwise with the particular tool or tool head in the machine with which it is associated. In any particular instance there may be dozens or even hundreds of the devices grouped on the board. Thus, if the machine is shut down and a light is turned on simultaneously beside the instrument which shut down the machine, the operator can tell at a glance which instrument has counted out and which tool or tools must be changed. After the tool change has been made, the operator returns the pointer to its starting position thereby opening the switch, and again placing the machine control circuit in operaing condition.

In addition to the above, the pointers collectively continuously give the operator a clear picture of the condition of all the tools in the machine. They indicate visually at any particular time during the operation of the apparatus by their positions on their scales the relative used and unused portions of the lives of all the tools. Thus, the operator, who may be busy a great deal of the time with other matters, may check the condition of the tools by periodically observing the tool control panel, and by being constantly aware of the condition of the tools he can better schedule or program his work so as to operate the machine with maximum efficiency.

In order to adapt the electrically operated devices to the apparatus disclosed in the copending application, the drive mechanisms of the pointers are equipped with clutches that can be operated to disengage the pointers from the drives and each pointer is equipped with a torsion spring which is tightened when the pointer is moved to its starting position and which operates to return the pointer automatically and immediately to its stop position when disengaged by the clutch from the drive mechanism. The clutches in turn are electrically actuated, and the clutch actuating means is controlled by a switch in the circuit comprising the invention of said application. This circuit actuates the switch automatically whenever a tool breaks for any reason, or whenever a tool is improperly set in the machine, and the switch in turn energizes the clutch actuating mechanism of the instrument associated with the broken or misset tool to return the pointer of that instrument to its stop position. If a tool breaks during a machine cycle, the switch is operated at the end of the cycle and the pointer associated with that tool is returned immediately to its stop position shutting down the machine and identifying the broken tool.

For a detailed description of the invention attention is directed to FIGURE 1 of the drawing which shows a preferred tool control device embodying the invention. The instrument there shown comprises a supporting frame having spaced parallel front and rear walls 10 and 12 provided with aligned bearings 14 and 16 respectively which rotatably support a shaft 18. A pointer 20 is fixed on the outer end of the shaft 18 to rotate therewith, and a dial plate 22 on the front wall 10 behind the pointer 20 has a circular scale 24 thereon traversed by the pointer as it turns with the shaft. The shaft 18 extends through a central opening in the dial plate 22 and the scale 24 is concentric to the shaft. Scale 24 preferably is slightly larger in diameter than the pointer 20 so that the end 25 of the pointer crosses over the scale marks and the exact position of the pointer on the scale is readily apparent at a glance.

As suggested, the scale 24 is calibrated in terms of the life expectancy of the tool with which the instrument is associated. The particular scale here shown by way of illustration is calibrated for eighteen hundred tool operations. However, the dial plate 22 here shown also is equipped with an angularly adjustable stop 26 that limits turning or rotation of the pointer 20 in a clockwise direction, as viewed in FIG. 2. Thus, the dial plate 22 can be used with any tool having a life expectancy of not more than eighteen hundred tool operations, and the adjustable stop 26 can be selectively positioned on the scale 24 for any number of operations less than eighteen hundred. In the drawing the stop 26 is positioned for approximately eleven hundred and fifty tool operations.

The pointer 20 is moved clockwise against the stop 26 and this position constitutes a starting position for the pointer. In use, the pointer 20 is rotated step-by-step in a counterclockwise direction to the zero position 28 on the scale 24 and this constitutes a stop position for the pointer.

Shaft 18 is rotated or turned to advance the pointer 20 on the scale 24 by a driving motor 30 not shown in FIGURE 1 but shown diagrammatically in FIG. 3. The drive shaft 32 of the motor 30 is operatively connected to the shaft 18 through a suitable reduction gearing 34 also shown diagrammatically in FIG. 3. The dotted line 36 in FIG. 3 represents any suitable form of mechanical connection between the shaft 18, the motor 30 and the reduction gearing 34.

It is a particular feature of this invention that a clutch, designated generally at 38 (FIGURE 1) is interposed between the shaft 18 and the drive 36. The clutch 38 here shown comprises a gear 40 which is loose on the shaft 18 and normally engaged with the friction face 42 of a disk 44 which is fixed on the shaft 18 by a crosspin 46. A lever 48 pivotally attached at 50 to a mounting bracket 52 on the rear wall 12 at one side of the clutch 38 overlays the gear 40. As clearly shown in the drawing, pressure members 54 formed on the lever 48 intermediate the ends thereof bear on the gear 40 and the free end of the lever overlays a solenoid 56. A compression spring 58 interposed between the front wall 10 and the free end of the lever 48 presses the latter against the gear 40 with sufficient force so that frictional engagement between the gear, and the disk 44 causes the two to rotate normally in unison. The gear 40 is engaged by a pinion 60 carried by a shaft 62 which conveniently is part of the drive 36.

Solenoid 56 conveniently can and is here shown to be controlled by the normally open contacts 3 of relay CR2 in the circuit (FIG. 6) of the copending application hereinabove referred to. Alternatively, the solenoid 56 can be controlled by the contacts 3 of solenoid CR2′ (FIG. 12) or by the contacts of relay CR10 (FIG. 14) in said application. When solenoid 56 is energized, it lifts the lever 48 against the spring 58 to relieve pressure exerted by pressure members 54 on the gear 40 sufficiently to release the driving connection between the disk 44 and the gear.

A torsion spring 64 which preferably is preloaded is connected at one end to the shaft 18 and at the other end to the wall 10 and is operative to turn the pointer 20 in a counterclockwise direction as viewed in FIG. 2 when the clutch 38 is released to disengage the shaft 18 from the drive 36. Thus, when the solenoid 56 operates to disengage the clutch 38, the torsion spring 64 turns the shaft 18 and advances the pointer 20 immediately to the stop position on the scale 24.

Also connected to and rotatable with the shaft 18 is a circular cam 66 which actuates a normally closed switch 68 mounted on a support 70 extending between and connected to the walls 10 and 12. The switch 68 is a conventional type operated by a resilient arm 71 which bears on the periphery of the cam 66. When the pointer 20 is turned to any position on the scale 24 except the stop position, the arm 71 rides on the periphery of the cam 40 to hold the switch 68 closed. However, when the pointer 20 moves to the stop position on scale 24, the arm 71 drops into a notch 72 in the periphery of the cam 66 to open the switch 68.

In the form of the invention here shown by way of illustration the switch 68 is shown in the machine control circuit. The machine is designated diagrammatically at 74 and the conductors of the main machine control circuit are designated at 76 and 78. Switch 68 is connected in series in conductor 78. As long as the switch 68 is closed, current flows uninterruptedly to the machine 74. However, when the switch 68 is open, the flow of current to the machine 74 is interrupted and the machine is shut down.

FIG. 3 shows diagrammatically how current is supplied to the motor 30 by a timer 80 and how a plurality of the tool control devices shown in FIGURE 1 are electrically connected to operate in the manner hereinabove described.

More particularly, the timer 80 has a main timer motor 82 electrically connected by conductors 84 and 86 to the main circuit lines 88 and 90. The motor 82 drives an arm 92 through a conventional clutch 94. These parts are illustrated diagrammatically in the drawing. It will be observed that the clutch 94 has drive and driven members 96 and 98, and the driven clutch member 98 is movable axially into and out of engagement with the drive member 96 by a solenoid 100 which is electrically connected to the main power lines 88 and 90 by conductors 102 and 104. When the solenoid 100 is energized it engages the clutch 94 so that the motor 82 rotates the arm 92, and when the solenoid 100 is de-energized the clutch 94 is disengaged to interrupt the driving connection between the motor 82 and the arm 92.

Gang switches 106 and 108 are provided in lines 86 and 104 respectively, as shown. The switches are mechanically connected for mutual operation by a member 110 and the latter has a laterally extending arm 112 disposed to be engaged by the arm 92. The latter normally is held retracted against a stop 114 and away from the switch actuating member 112 by a spring 116. Both switches 106 and 108 are normally closed and motor 82 runs continuously. When solenoid 100 is energized, it engages the clutch 94 so that the arm 92 rotates in the direction of the arrow to engage the switch actuating member 112 and open the switches 106 and 108. Since the motor 82 operates at a constant speed, the time required after the clutch 94 is engaged for the arm 92 to open the switches 106 and 108 is accurately controlled. In a typical operation there is a three second interval between the time clutch 94 is engaged and the switches 106 and 108 are opened.

The solenoid 100 is controlled by a master switch 118 in the line 102 between the solenoid and the main circuit conduit 88. As suggested, the master switch 118 is located at any point on the machine where it will be actuated momentarily by some moving part of the machine. In the drawing the numeral 120 designated a fragmentary part of the machine which, for example, may be a switch operating dog mounted on one of the tool slides. In a typical operation, as the part 120 moves to its extreme position of travel it closes the switch 118 and then reverses its direction of travel to again open the switch. While the switch 118 is closed it energizes the solenoid 100 to engage the clutch 94 and connect the motor 82 to the timer arm 92 which then operates after a predetermined time interval to open the gang switches 106 and 108 in the manner described. Care must be exercised, of course, to select a machine part that will not keep the switch 118 closed longer than the operating time of the timer 80.

In order to assure that the solenoid 100 remains energized for at least the period of operation of the timer 80, regardless of the length of time the switch 118 remains closed, a relay 122 is connected in parallel with the solenoid 100 by conductors 124 and 126. Relay 122 operates normally open switches 128 and 130. Switch 128 is connected across the master switch 118 by conductors 132 and 134, as shown. Thus, when the master switch 118 is closed, the solenoid 100 and relay 122 are energized simultaneously and switches 128 and 130 are closed. Since switch 128 is in by-pass relation to the master switch 118 it remains closed even though the master switch 118 is released by the machine part 120 and accordingly locks in the solenoid 100 and relay 122 until the circuit therethrough is interrupted by opening of the main timer switches 106 and 108.

The other switch 130 controls flow of current through the various motors which operate the tool indicator devices hereinabove described. For example, in the circuit shown by way of illustration, one contact of the switch 130 is connected to the main circuit line 88 by conductor 136 and the other contact thereof is connected to one side of the motor 30 by conductors 138 and 140. The other side of the motor 30 is connected to the main circuit line 90 by conductor 142. Thus, closure of the master switch 118 energizes the motor 30 at the same time it starts the timer 80 in operation, and the motor 30 remains energized for the operating time of the timer 80 and until the gang switches 106 and 108 are opened to drop out relay 122 and open switch 130.

The wiring diagram of FIG. 3 shows two tool control devices electrically connected in parallel. In this connection it will be observed that a second motor 144 corresponding to the motor 30 is connected at one side to the main circuit line 88 through the switch 130 by conductors 146, 148, 138 and 136. The motor 144 also is connected to the other main circuit line 90 by a conductor 150.

As suggested, as many tool control devices and accordingly as many motors similar to the motors 30 and 144 are connected in parallel in the circuit as are required to keep track of the tools in the particular machine with which the apparatus is associated. In practice, there may be several dozen or several hundred such devices. Only two devices are shown in the wiring circuit by way of illustration, however, and it will be understood that as many more as are required are added in a particular situation.

As shown in FIG. 3, the switch operating cam of each tool control device operates two switches. In the one tool control device here shown in detail the cam operates the switch 68 as hereinabove described and it also operates a second switch 152 which is connected for mutual operation with the switch 68. The numeral 153 designates any suitable form of mechanical connection between the two switches 68 and 152 and between these switches and the operating cam which conveniently may be a cam similar to the one shown at 66 in FIG. 1. Switch 152 is electrically connected in series with the motor 30. Thus, at the same time that switch 68 opens to shut down the machine 74 or otherwise signal the operator that the life expectancy of the tool associated with the device has expired, switch 152 is opened to interrupt the circuit through motor 30.

The second tool control device shown diagrammatically in FIG. 3 also has two switches 154 and 156 connected together for mutual operation in the same manner as the switches 68 and 152 and, while it is not shown, it will be understood that the switches are operated by a cam driven by the motor 144 in the same manner as the first device shown. Switch 154 is electrically connected in series with switch 68 by conductors 158 and 160. Switch 156 is electrically connected to conductor 146 and in series with the motor 144. Switches 68 and 154 are electrically connected in any suitable or desirable manner to the control circuit of the machine as illustrated diagrammatically in FIGURE 1.

In use, each operation of the master switch 118 energizes the timer 80 for a predetermined interval of time such as three seconds, for example, and the timer supplies current simultaneously to all of the tool control devices to which it is electrically connected for the time interval of its operation. In the suppositious situation referred to, all of the tool control devices are energized for three seconds. During their period of operation, the motors of the tool control devices acting through reduction gearing rotate their pointers one increment of dial space. The machine cycles repeatedly, usually automatically, and as it cycles the pointers of the tool control devices move intermittently step-by-step toward their stop positions. Whenever the pointer of any tool control device reaches its stop position it interrupts the control circuit of the machine or otherwise signals the operator that the tool associated therewith requires changing. The operator then changes the tool, returns the pointer of the tool control device which occasioned the shutdown to its starting position and the machine tool continues its operating cycle until another one of the control devices shuts it down. In addition, any emergency tool condition created by a broken or improperly set tool, for example, will energize the solenoid 56 of the tool control device associated with such tool to advance the pointer of the device immediately to its stop position thereby shutting down the machine tool and apprising the operator of the abnormal condition.

Having thus described the invention, we claim:

1. Apparatus for programing tool changes for a machine tool of the type having a control circuit and a plurality of different tools adapted to perform work on workpieces in the machine and having different spans of sharp life, said machine tool having a member operable in timed relation to and in accordance with the work performed on said workpieces, said apparatus comprising means for individually designating the life spans of said tools including electrically operated devices associated with respective tools in the machine, said devices having scales calibrated in terms of tool life and pointers independently movable on said scales, said scales having selected visible starting positions and stop positions the distance between which represents in each instance the optimum life of the particular tool with which the scale is associated, said pointers being individually manually movable to said selected starting positions and between said starting and stop positions, said devices adapted to move the pointers individually and simultaneously from said starting positions toward and to said stop positions, said member adapted to collectively energize said devices and simultaneously actuate said pointers whereby the latter are coactive with said member periodically and successively in accordance with work performed by said tools, said electrically operated devices adapted to move said pointers successively step-by-step from said starting positions at a rate to cause each pointer to reach its stop position when the optimum life of the tool with which it is associated has expired, means coactive with each pointer rendered operative by said step-by-step movement thereof to its stop position for designating when the life span of the tool associated therewith is completed, said pointers collectively indicating visually at any particular time during operation of said apparatus by their positions on said scales the relative used and unused portions of the lives of all of said tools, means cooperative with said pointers for opening said control circuit of the machine to shut down said machine whenever any of said pointers reaches the stop position on its scale, and separate means associated with each of said devices rendered operative by a predetermined abnormal condition of the tool with which said device is associated to move the pointer of said device at an accelerated rate to its stop position whereby to render said last mentioned means operative to shut down the machine substantially immediately upon the operation of said separate means.

2. Apparatus for programing tool changes for a machine tool of the type having a plurality of different tools adapted to perform work on workpieces in the machine and having different spans of sharp life, said machine tool having a member operable in timed relation to and in accordance with the work performed on said workpieces, said apparatus comprising means for individually designating the life spans of said tools including electrically operated devices each associated with a respective one of said tools, said devices having indicators independently movable between starting positions and stop positions the distance between which represents in each instance the optimum life of the particular tool with which said device is associated, said member adapted to energize said devices collectively periodically and successively in accordance with work performed by said tools, said electrically operated devices adapted to move said indicators individually and simultaneously successively step-by-step from said starting positions at a rate to cause each indicator to reach its stop position when the optimum life of the tool with which it is associated has expired, said indicators collectively showing visually at any particular time during the operation of said apparatus by their relative positions between their respective start and stop positions the relative used and unused portions of the lives of all of said tools, electrically energized signal means coactive with each indicator rendered operative by said step-by-step movement thereof to its stop position for designating when the life span of the tool associated therewith is completed, and separate means rendered operative by a predetermined abnormal condition of a tool in said machine to move the indicator associated with said tool at an accelerated rate to its stop position whereby to operate said signal means substantially immediately upon the occurrence of such condition.

3. A tool control device comprising a rotatable indicator adapted to be rotatably actuated from an initial starting position to a stop position the distance between which represents the optimum life of a tool associated therewith, clutch means, rotary drive means connected to the indicator through said clutch means adapted to be actuated periodically as a function of tool operation and operative to move said indicator from its starting position to its stop position at a rate to cause the indicator to reach said stop position when the optimum life of the tool with which it is associated has expired, clutch actuating means rendered operative by a predetermined condition of said tool to disengage said indicator from said drive means, and means coactive with said indicator and rendered operative by operation of said clutch operating means to advance the indicator to its stop position immediately when disengaged from said drive means by said clutch.

4. A tool control device comprising a rotatable indicator adapted to be rotatably actuated from an initial starting position to a stop position the distance between which represents the optimum life of a tool associated therewith, clutch means, rotary drive means connected to said indicator through said clutch means adapted to be actuated periodically as a function of tool operation and operative to move the indicator successively and step-by-step from its starting position to its stop position at a rate to cause the indicator to reach its stop position when the optimum life of the tool with which it is associated has expired, clutch actuating means rendered operative by a predetermined abnormal condition of said tool to disengage said indicator from said drive means, and a torsion spring connected to said indicator adapted to be tightened as the latter is moved to its starting position and operative to advance the same to its stop position immediately when disengaged from said drive means by said clutch.

5. A tool control device comprising a tool life indicator movable between a starting position and a stop position, a clutch means, drive means connected to said indicator through said clutch means adapted to be actuated periodically as a function of tool operation and operative to move the indicator successively step-by-step from its starting position to its stop position, clutch actuating means for operating said clutch to disengage said indicator from said drive means upon the occurrence of a predetermined contingency, and means connected to said indicator rendered operative by disengagement of said clutch to advance said indicator immediately to its stop position.

6. A tool control device comprising a scale calibrated in terms of tool life and a pointer movable on said scale to a starting position representing the life span of a tool with which said device is associated, said scale also having a stop position and the distance between said starting and stop positions representing the optimum life of said tool, said pointer being manually movable to said selected starting position and between said starting and stop positions, clutch means, drive means connected to said pointer through said clutch means adapted to be actuated periodically as a function of tool operation and operative to move the pointer from said starting position to said stop position at a rate to cause the pointer to reach the stop position when the optimum life of the tool with which it is associated has expired, clutch actuating means rendered operative by a predetermined abnormal condition of said tool for operating said clutch to disengage the pointer from said drive means, and means rendered operative by operation of said clutch to advance the pointer to the stop position when disengaged from said drive means by said clutch.

7. A tool control device comprising a scale calibrated in terms of tool life and a rotatable pointer movable on said scale to a starting position representing the life span of a tool with which said device is associated, said scale also having a stop position and the distance between said starting and stop positions representing the optimum life of said tool, said pointer being manually movable to said selected starting position and between said starting and stop positions, clutch means, rotary drive means connected to said pointer through said clutch means adapted to be actuated periodically as a function of tool operation and operative to move the pointer from said starting position to said stop position successively step-by-step at a rate to cause the pointer to reach its stop position when the optimum life of the tool with which it is associated has expired, clutch actuating means rendered operative by a predetermined abnormal condition of said tool for operating said clutch to disengage the pointer from said drive means, and a torsion spring connected to said indicator adapted to be tightened as said indicator is moved to its starting position and operative to move the same to its stop position immediately upon operation of said clutch to disengage said pointer from said drive means.

References Cited in the file of this patent
UNITED STATES PATENTS

| | | |
|---|---|---|
| 2,417,795 | Yardeny | Mar. 18, 1947 |
| 2,719,887 | Allen | Oct. 4, 1955 |
| 2,735,915 | Hagen | Feb. 21, 1956 |
| 2,783,461 | Paulick | Feb. 26, 1957 |